(12) United States Patent
Takemura et al.

(10) Patent No.: US 9,965,690 B2
(45) Date of Patent: May 8, 2018

(54) ON-VEHICLE CONTROL DEVICE

(71) Applicant: Clarion Co., Ltd., Saitama-shi, Saitama (JP)

(72) Inventors: Masayuki Takemura, Tokyo (JP); Takehito Ogata, Tokyo (JP); Satoshi Ito, Yamato (JP)

(73) Assignee: Clarion Co., Ltd., Saitama-shi (JP)

(*) Notice: Subject to any disclaimer, the term of this patent is extended or adjusted under 35 U.S.C. 154(b) by 16 days.

(21) Appl. No.: 14/647,282

(22) PCT Filed: Nov. 21, 2013

(86) PCT No.: PCT/JP2013/081427
§ 371 (c)(1),
(2) Date: May 26, 2015

(87) PCT Pub. No.: WO2014/084122
PCT Pub. Date: Jun. 5, 2014

(65) Prior Publication Data
US 2015/0302257 A1    Oct. 22, 2015

(30) Foreign Application Priority Data
Nov. 27, 2012 (JP) .................................. 2012-259044

(51) Int. Cl.
*G06K 9/00* (2006.01)
*H04N 5/217* (2011.01)
(Continued)

(52) U.S. Cl.
CPC ............ *G06K 9/00798* (2013.01); *B60R 1/00* (2013.01); *B62D 15/028* (2013.01);
(Continued)

(58) Field of Classification Search
CPC .......................... G06K 2009/4666; G06T 7/20
See application file for complete search history.

(56) References Cited

U.S. PATENT DOCUMENTS

2006/0228001 A1* 10/2006 Tsukamoto ........... B60S 1/0822
                                                        382/104
2007/0115357 A1*  5/2007 Stein .................... B60Q 1/0023
                                                        348/148
(Continued)

FOREIGN PATENT DOCUMENTS

EP    1 826 648 A2    8/2007
EP    2 381 416 A1   10/2011
(Continued)

OTHER PUBLICATIONS

European Search Report issued in counterpart European Application No. 13858517.9 dated Jul. 4, 2016 (eight pages).
(Continued)

*Primary Examiner* — Oneal R Mistry
(74) *Attorney, Agent, or Firm* — Crowell & Moring LLP

(57) ABSTRACT

An on-vehicle control device includes: an image acquiring unit that acquires a captured image from an image-capturing device, the image-capturing device capturing an image of surroundings of a vehicle; a judged range dividing unit that divides a predetermined judged range of an image-capturing range of the image-capturing device into a plurality of regions; a feature point extracting unit that extracts a feature point having predetermined characteristics in the surroundings of the vehicle from the image acquired by the image acquiring unit; a point accumulating unit that accumulate points for a region where there is the feature point extracted by the feature point extracting unit, among the plurality of regions, for a plurality of images acquired by the image acquiring unit in time series; and a judging unit that judges whether a foreign matter is adhered to the image-capturing device based on scores resulting from accumulating points of the plurality of regions.

6 Claims, 8 Drawing Sheets

(51) Int. Cl.
- *B60R 1/00* (2006.01)
- *G06K 9/46* (2006.01)
- *G06K 9/52* (2006.01)
- *G06T 7/20* (2017.01)
- *B62D 15/02* (2006.01)

(52) U.S. Cl.
CPC .......... *B62D 15/0285* (2013.01); *G06K 9/46* (2013.01); *G06K 9/52* (2013.01); *G06T 7/20* (2013.01); *H04N 5/2171* (2013.01); *G06K 2009/4666* (2013.01)

(56) References Cited

U.S. PATENT DOCUMENTS

| | | | | |
|---|---|---|---|---|
| 2009/0322872 | A1* | 12/2009 | Muehlmann | G01S 11/12 348/142 |
| 2010/0066825 | A1* | 3/2010 | Kuboyama | G06K 9/00812 348/118 |
| 2011/0243457 | A1* | 10/2011 | Miyajima | G01C 21/3602 382/209 |
| 2011/0273582 | A1* | 11/2011 | Gayko | G06T 5/005 348/222.1 |
| 2013/0141580 | A1* | 6/2013 | Stein | H04N 7/18 348/148 |
| 2014/0028849 | A1* | 1/2014 | Tsuchiya | G06K 9/00791 348/148 |
| 2014/0200759 | A1* | 7/2014 | Lu | B60D 1/245 701/28 |

FOREIGN PATENT DOCUMENTS

| | | |
|---|---|---|
| JP | 8-202998 A | 8/1996 |
| JP | 2002-94978 A | 3/2002 |
| JP | 2012-166705 A | 9/2012 |

OTHER PUBLICATIONS

International Search Report (PCT/ISA/210) dated Feb. 4, 2014 with English translation (three pages).

* cited by examiner

ON-VEHICLE CONTROL DEVICE

TECHNICAL FIELD

The present invention relates to an on-vehicle control device that is mounted on a vehicle and judges whether foreign matters are adhered to an image-capturing device which captures images of the surroundings of the vehicle.

BACKGROUND ART

Conventionally, a technology is known in which white lines of traffic lanes or parking places are recognized by utilizing images captured by image-capturing devices (cameras) mounted on a vehicle, so that the recognition results are utilized for lane recognition or parking frame detection. In such a technology, if raindrops, dirt, or the like are adhered to the image-capturing devices (cameras), the accuracy of recognizing white lines of traffic lanes or parking places is reduced and therefore the accuracy of lane recognition or parking frame detection is reduced. Thus, a variety of approaches for detecting adhesion of raindrops, dirt, or the like to the image-capturing devices (cameras) have been proposed (PTL1).

CITATION LIST

Patent Literature

PTL1: Japanese Laid-Open Patent Publication No. 2012-166705

SUMMARY OF INVENTION

Technical Problem

The technology of PTL1 is to detect adhesion of foreign matters, such as raindrops or dirt, to a lens of an on-vehicle camera by taking advantage of uniformity of the length and distance of dashed traffic lane lines. However, in the technology of PTL1, a problem of complicated processing arises because it is necessary to accurately recognize the length and distance of the dashed traffic lane lines. In addition, it is merely judged whether or not foreign matters are adhered to the lens of the on-vehicle camera based on presence or absence of uniformity of the length and distance of the dashed traffic lane lines, and it is not judged at which positions the foreign matters are adhered. Therefore, this technology cannot be used for applications which need information about positions of adhered foreign matters. Thus, there is a problem of limited applicability of the judgment result. Furthermore, this approach is not applicable if white lines have no periodicity because of a dirty road or faded white lines, which is another problem.

Solution to Problem

According to the 1st aspect of the present invention, an on-vehicle control device, comprises: an image acquiring unit that acquires a captured image from an image-capturing device, the image-capturing device capturing an image of surroundings of a vehicle; a judged range dividing unit that divides a predetermined judged range of an image-capturing range of the image-capturing device into a plurality of regions; a feature point extracting unit that extracts a feature point having predetermined characteristics in the surroundings of the vehicle from the image acquired by the image acquiring unit; a point accumulating unit that accumulate points for a region where there is the feature point extracted by the feature point extracting unit, among the plurality of regions, for a plurality of images acquired by the image acquiring unit in time series; and a judging unit that judges whether a foreign matter is adhered to the image-capturing device based on scores resulting from accumulating points of the plurality of regions.

According to the 2nd aspect of the present invention, in the on-vehicle control device according to the 1st aspect, it is preferred that the judging unit judges whether a foreign matter is adhered, based on scores resulting from accumulating points of consecutive regions in a vehicle traveling direction, among the plurality of regions in the judged range.

According to the 3rd aspect of the present invention, in the on-vehicle control device according to the 1st or 2nd aspect, it is preferred that the feature point having the predetermined characteristics in the surroundings of the vehicle is a driving traffic lane line on a road.

According to the 4th aspect of the present invention, in the on-vehicle control device according to any one of the 1st to 3rd aspects, it is preferred that the point accumulating unit performs processing of accumulating points if the vehicle travels on a road at a speed equal to or higher than a predetermined speed.

According to the 5th aspect of the present invention, in the on-vehicle control device according to the 4th aspect, it is preferred that: the point accumulating unit subtracts points from the accumulated scores if the vehicle travels on the road at a speed lower than the predetermined speed; and the judging unit judges whether a foreign matter is adhered to the image-capturing device, based on scores resulting from accumulating and subtracting points by the point accumulating unit for the plurality of regions.

According to the 6th aspect of the present invention, in the on-vehicle control device according to the 5th aspect, it is preferred that if the vehicle travels on the road at a speed lower than the predetermined speed, the point accumulating unit gradually subtracts points, a number of which is smaller than a number of points to be accumulated if the vehicle travels on the road at a speed equal to or higher than the predetermined speed, from the accumulated scores, so that the accumulated scores are reset if the vehicle continues to travel at the speed lower than the predetermined speed.

According to the 7th aspect of the present invention, in the on-vehicle control device according to any one of the 1st to 6th aspects, it is preferred that the judging unit determines a maximum value and a mean value of the accumulated scores of consecutive regions in a vehicle traveling direction, among the plurality of regions in the judged range, and judges a region having an accumulated score lower than the maximum value by a first predetermined value or more and lower than the average value by a second predetermined value or more, as a region where a foreign matter is adhered, among the consecutive regions in the vehicle traveling direction.

According to the 8th aspect of the present invention, in the on-vehicle control device according to any one of the 1st to 7th aspects, it is preferred that the judged range dividing unit divides the judged range into a plurality of regions with reference to distance on a screen or distance on a road surface in a vehicle traveling direction, and with reference to distance on the road surface in a direction orthogonal to the vehicle traveling direction.

Advantageous Effects of Invention

According to the present invention, adhesion of foreign matters to an image-capturing device can be quickly and reliably judged by means of a simple approach. Additionally, it can also be judged at which positions of the image-capturing device the foreign matters are adhered.

BRIEF DESCRIPTION OF DRAWINGS

FIG. 4 A view illustrating an example of an image of a range ahead of a vehicle captured by the camera 2a.

FIG. 6 A view illustrating another example of the image of the range ahead of the vehicle captured by the camera 2a.

DESCRIPTION OF EMBODIMENTS

Figure 1:
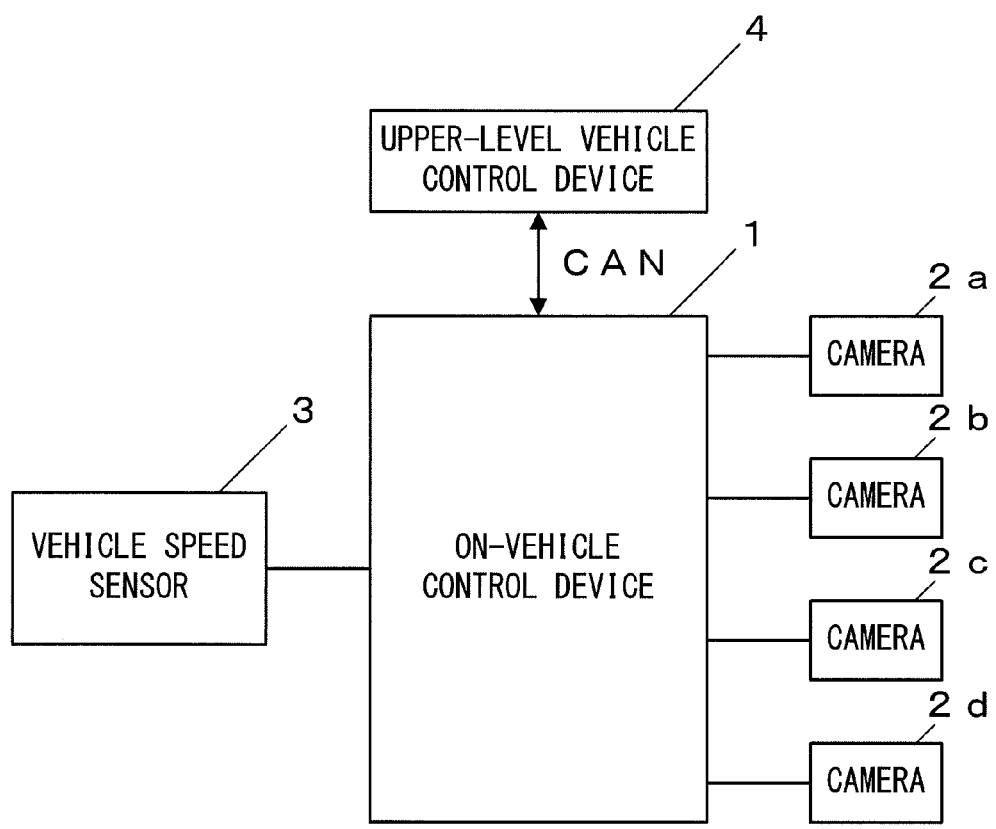
FIG. 1 A block diagram illustrating an on-vehicle control device 1 according to one embodiment of the present invention.

FIG. 1 is a block diagram illustrating an on-vehicle control device 1 according to one embodiment of the present invention. The on-vehicle control device 1 illustrated in FIG. 1 is mounted on a vehicle for use. Cameras 2a, 2b, 2c, and 2d, and a vehicle speed sensor 3 are connected to the on-vehicle control device 1. The on-vehicle control device 1 is also connected to an upper-level vehicle control device 4, which is at an upper level than the on-vehicle control device 1, by way of a CAN (Controller Area Network).

The cameras 2a-2d are constructed by image sensors (image-capturing elements) such as CCDs and CMOSs, peripheral circuits, optical lenses, and other components and attached to parts of the vehicle, such as bodies, bumpers, and door mirrors. These cameras 2a-2d are referred to as image-capturing devices.

The cameras 2a-2d capture images (take pictures) of the surroundings of the vehicle in their respective different image-capturing ranges. The image-capturing ranges of these cameras are established so as to together cover the entire surroundings of the vehicle. It is assumed in this embodiment that the camera 2a captures an image of an image-capturing range ahead of the vehicle, the camera 2b captures an image of an image-capturing range on the left side of the vehicle, the camera 2c captures an image of an image-capturing range on the right side of the vehicle, and the camera 2d captures an image of an image-capturing range behind the vehicle. The respective captured images acquired by the cameras 2a-2d at a predetermined frame rate interval are output to the on-vehicle control device 1.

The on-vehicle control device 1 synthesizes an overhead view image (top-view image) representing the entire surroundings of the vehicle seen from above, based on the captured images acquired by the cameras 2a-2d. The overhead view image is synthesized by performing coordinate transformation (overhead view transformation) on the captured images of the cameras 2a-2d depending on their image-capturing directions and then stitching the images.

The on-vehicle control device 1 recognizes parking frames (parking range lines) in the surroundings of the vehicle or driving traffic lanes, by performing a predetermined arithmetic processing based on the synthesized overhead image. The recognition result of the parking frames or driving traffic lanes is output to the upper-level vehicle control device 4, which is at an upper level of the on-vehicle control device 1, by way of the CAN and used for parking assistance, driving control, or other operations of the vehicle. For example, it can be automatically recognized whether there is a parking place in the surroundings of the vehicle and, if this is a parking place environment, a display mode can be automatically switched to display an overhead view image of the surroundings of the vehicle. In this way, a problem of falsely detecting a public road as a parking place can be alleviated and the image to be presented to a user can be switched at the right timing. In addition, parking assistance can be achieved, for example, by calculating a traveling path to a parking frame based on a relative position of the vehicle to the parking frame in order to notify a driver of the timing of braking or shift position change operation or the amount of steering angle to be turned. In this way, a parking operation can be completed in a short time, even by a driver unaccustomed to driving operations such as parking. Furthermore, it is also conceivable to calculate a traveling path to a parking frame based on a relative position of the vehicle to the parking frame and automatically calculate control amounts of forward/backward and rotational motions of the vehicle in order to automatically control the motion of the vehicle in accordance with the calculation result. In this way, a parking operation can be safely and accurately completed, even by a driver unaccustomed to driving operations such as parking.

The on-vehicle control device 1 thus provides information used for parking assistance, driving control, and other operations of the vehicle, based on the captured images acquired by the cameras 2a-2d. Therefore, it is desirable that the captured images acquired by the cameras 2a-2d have no defect. However, the cameras 2a-2d are provided outside of the vehicle and it is therefore inevitable that raindrops or dirt such as mud are adhered to the cameras during the vehicle traveling. It is thus necessary to accurately determine whether foreign matters such as raindrops and dirt are adhered and quickly and reliably provide this information to an upper-level application or the like.

The on-vehicle control device 1 in this embodiment is characterized by quickly and reliably determining adhesion of foreign matters such as raindrops and dirt such as mud as described above by means of a simple approach and providing this information to an upper-level application. In this point of view, the on-vehicle control device 1 may also be referred to as a foreign matter adhesion judging device for an on-vehicle image-capturing device (an camera). The on-vehicle control device 1 may also be referred to as a device of judging about hiding due to adhered matters because it judges whether traffic lane lines or the like are hidden due to adhesion of foreign matters such as raindrops or mud dirt. The on-vehicle control device 1 may also be referred to as an on-vehicle environment recognizing device. This will be described hereinafter in detail.

The on-vehicle control device 1 includes therein a CPU, a peripheral circuit, a memory, and other components. The on-vehicle control device 1 executes a predetermined program stored in the memory to judge adhesion of foreign matters such as raindrops or mud dirt and output the judgment result to an upper-level application. The upper-level application is an application for detecting parking frames or an application for recognizing traffic lanes. The judgment result may also be output to applications for detecting vehicles, three-dimensional objects, or pedestrians, for example.

Figure 2:
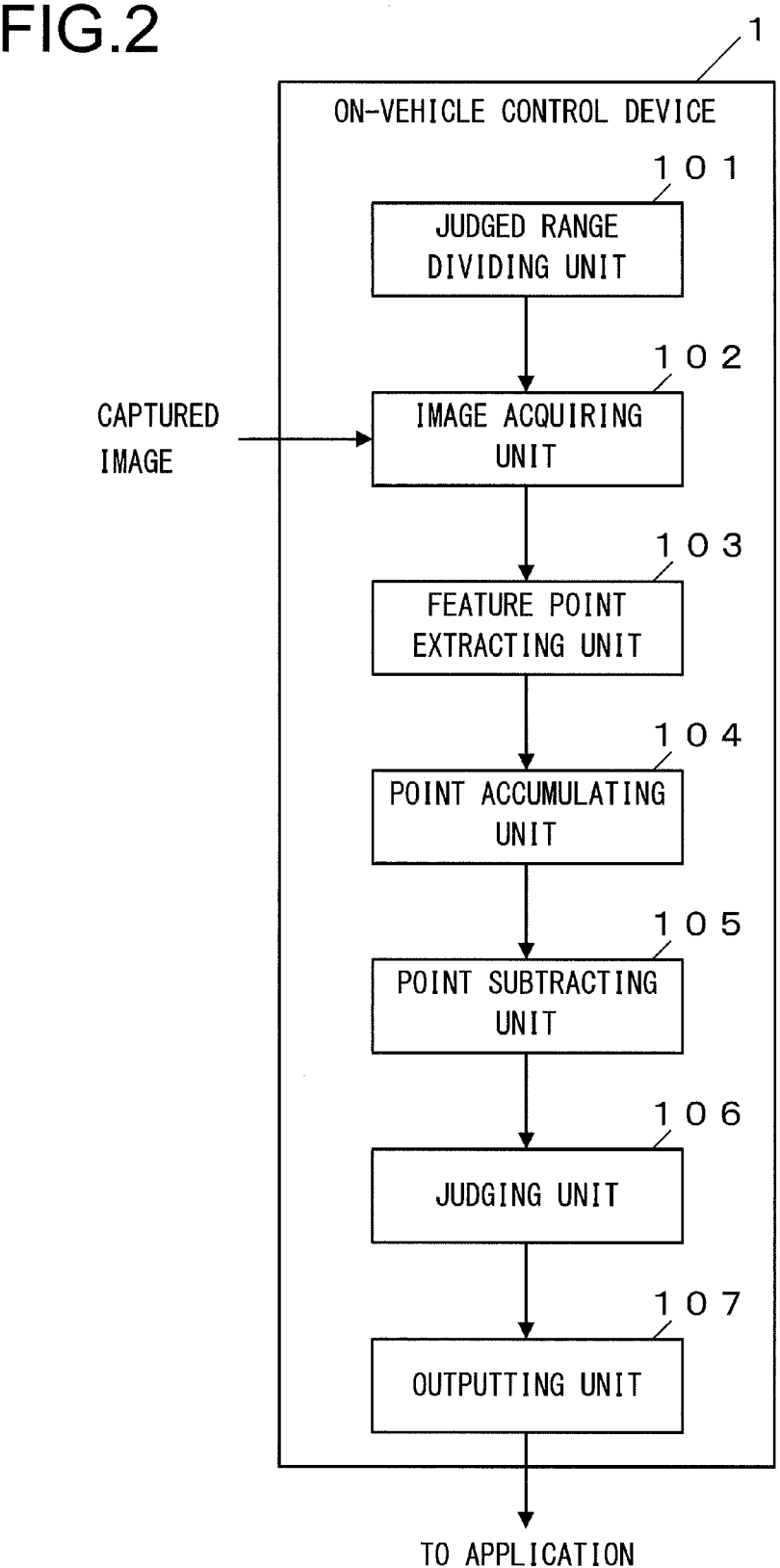
FIG. 2 A control block diagram of an arithmetic processing performed by the on-vehicle control device 1.

FIG. 2 is a control block diagram of an arithmetic processing performed by the on-vehicle control device 1. As illustrated in FIG. 2, the on-vehicle control device 1 operatively includes control blocks such as a judged range dividing unit 101, an image acquiring unit 102, a feature point extracting unit 103, a point accumulating unit 104, a point subtracting unit 105, a judging unit 106, and an outputting unit 107. Each of these control blocks is achieved by the CPU of the on-vehicle control device 1 executing a program corresponding to each of the control blocks. Judgment of adhesion of foreign matters to the camera 2a which captures an image of the range ahead of the vehicle will now be described as an example.

Figure 3:
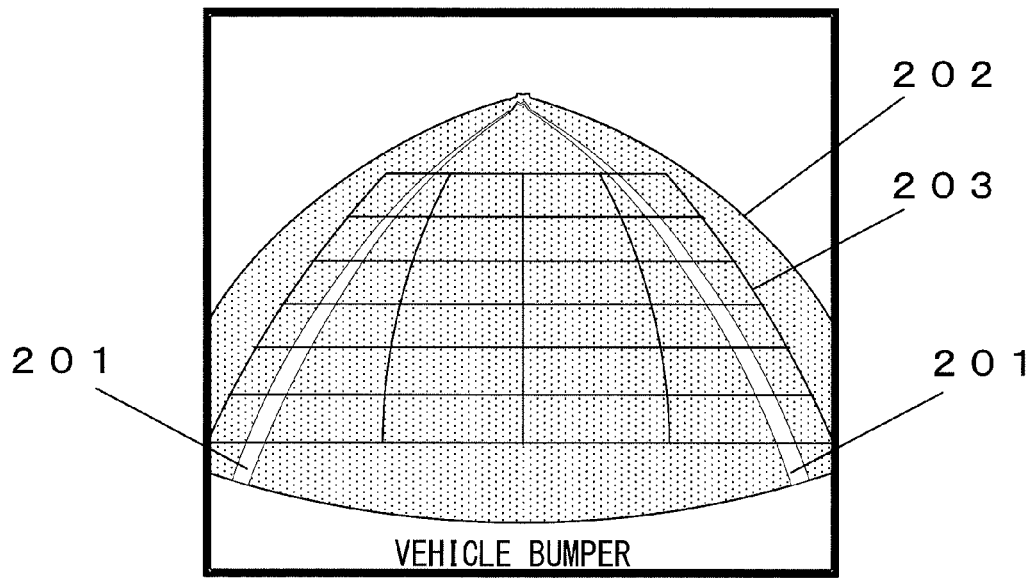
FIG. 3 A view illustrating an example of dividing a predetermined judged range of a camera 2a into a plurality of regions.

The judged range dividing unit 101 sets a judged range to be judged whether foreign matters are adhered, in an image-capturing range of the camera 2a, and divides the judged range into a plurality of regions. In addition, score areas for storing cumulative or accumulated scores (each showing the number of accumulated points) corresponding to the plurality of divided regions are provided in the memory. FIG. 3 is a view illustrating an example of dividing the judged range in the camera 2a into a plurality of regions. FIG. 3 illustrates an image of a road 202 captured by the camera 2a which is a fish-eye lens, wherein traffic lane lines (white lines) 201 are drawn on a road surface ahead of the vehicle. In the example in FIG. 3, the judged range dividing unit 101 divides the judged range at equal distances with reference to distance on a screen in a vehicle traveling direction, and at equal distances with reference to distance on the road surface in a direction orthogonal to the vehicle traveling direction, i.e. in the lateral direction on the screen.

It is not necessarily to set the whole image-capturing range of the camera 2a as the judged range to be judged whether foreign matters are adhered, but a range 203 illustrated in FIG. 3 may be set as the judged range. For example, the judged range extends from a predetermined position before the vanishing point of the fish-eye lens to a position before the position of a bumper of this vehicle on the screen in the vertical direction (the vehicle traveling direction) in FIG. 3, and extends up to positions of approximately 2 meter from the vehicle in the right and left direction (the vehicle lateral direction), for example.

Since the fish-eye lens is used in the camera 2a, an image is compressed around the vanishing point on the horizon ahead of the vehicle, which results in a lower accuracy of white line recognition or the like around there. Therefore, the judged range 203 ends before the point. However, the judged range 203 is not necessarily limited to the example in FIG. 3 and may be suitably set to be a range in which the white lines on the road surface can be correctly recognized. Here, an attachment position of the camera 2a, an orientation of the camera, and other settings are predetermined for the vehicle. Therefore, the setting data is used to set the judged range to be judged whether foreign matters are adhered, in the image-capturing range of the camera 2a.

In the example illustrated in FIG. 3, the judged range 203 is divided in four with the vehicle traveling direction (vertical direction) and in six with the lateral direction of the vehicle. However, the way of division is not necessarily limited to the example in FIG. 3 and the number of divided regions may be larger or smaller than that in the example in FIG. 3.

The image acquiring unit 102 acquires the captured images from the camera 2a in time series and at a predetermined time interval, for example every 100 ms.

The feature point extracting unit 103 analyzes the captured images acquired by the image acquiring unit 102 to extract feature points. In this embodiment, the feature points that represent traffic lane lines drawn on a road surface are extracted. Namely, the traffic lane lines on the road surface are extracted. The traffic lane lines are dashed or solid, white or yellow (orange) lines. Approaches of extracting traffic lane lines include, for example, an approach of extracting an edge point in the captured image and extracting the traffic lane lines based on the extracted edge point, wherein the edge point has a change in brightness equal to or higher than a predetermined threshold in a horizontal search. However, the approaches of extracting traffic lane lines from an captured image are well-known and any of various well-known approaches may be employed in this embodiment. It will be noted that the traffic lane lines may be extracted only in the judged range 203 to be judged whether foreign matters are adhered, in this embodiment. The traffic lane lines extracted here include roadway center lines, lane markings, and roadway edge markings drawn on the road, for example.

The point accumulating unit 104 adds and accumulates points for a region where there is the feature point, i.e. traffic lane line extracted in the feature point extracting unit 103. In other words, the point accumulating unit 104 determines in which region among the plurality of regions divided by the judged range dividing unit 101 the traffic lane line extracted in the feature point extracting unit 103 is located, and adds and accumulates points for the region where the traffic lane line is located. For example, 10 points are added. Specifically, the cumulative scores are stored in the score areas, which are provided in the memory by the judged range dividing unit 101 and correspond to the plurality of divided regions. This can also be represented as "voting" for the range where the traffic lane line is located, among the plurality of regions divided by the judged range dividing unit 101.

The point accumulating unit 104 does not perform the addition processing, if the vehicle travels at a speed lower than a predetermined speed (10 km/h). For example, when the vehicle is stopped, the images acquired by the camera 2a are always almost identical. It is inappropriate to extract traffic lane lines or the like from these images and accumulate the points. This is also the case with a low vehicle speed. In other words, the accumulation processing is performed if the vehicle travels on the road at a predetermined speed or higher, so that detection of a traffic lane line and accumulation of points are evenly performed in consecutive regions in the vehicle direction, which allows an accurate judgment of adhesion of foreign matters.

The point subtracting unit 105 performs a processing in which points smaller than the points to be added are subtracted for all of the plurality of regions divided by the judged range dividing unit 101 (normal subtraction). If the score (points) is already zero, the score remains zero. For example, 5 points are subtracted. As a result, 5 points are added for the region where there is the traffic lane line extracted in the feature point extracting unit 103, while 5 points are subtracted for the region where there is no traffic lane line extracted in the feature point extracting unit 103.

This subtraction processing is performed in order to reflect a state in which a traffic lane line is no longer detected or foreign matters are adhered in a region where the traffic lane line was detected and no foreign matter was adhered so that points were accumulated. It should be noted that the points to be subtracted are smaller than the points to be added so as to slowly reduce scores in comparison to addition and accumulation. With this subtraction processing, the score of the region where the traffic lane line can no longer be detected due to adhesion of foreign matters finally becomes zero.

The point subtracting unit 105 performs a processing of subtracting points, also if the vehicle travels at a speed lower than a predetermined speed (10 km per hour) (subtraction at low speed). The points to be subtracted in this case are smaller than the points to be added and also smaller than the points to be subtracted in the normal subtraction. For example, 2 points or so are subtracted. This subtraction processing is performed for the same reason as the fact that the point accumulating unit 104 does not perform the addition processing if the vehicle travels at a speed lower than the predetermined speed (10 km/h). Another reason is that a previous cumulative score would be kept unchanged without this subtraction processing. Because the points to be subtracted are smaller than that of the normal subtraction, the score is slowly reduced than in the case of the normal subtraction. However, if the vehicle continues to travel at a speed lower than the predetermined speed (10 km per hour) for a long time (including a vehicle stopping state), the cumulative scores of all regions finally become zero, which is equivalent to a reset state.

The judging unit 106 judges whether foreign matters such as raindrops or dirt are adhered to the camera 2a, based on the resulting cumulative scores in the plurality of regions divided by the judged range dividing unit 101.

Figure 4:
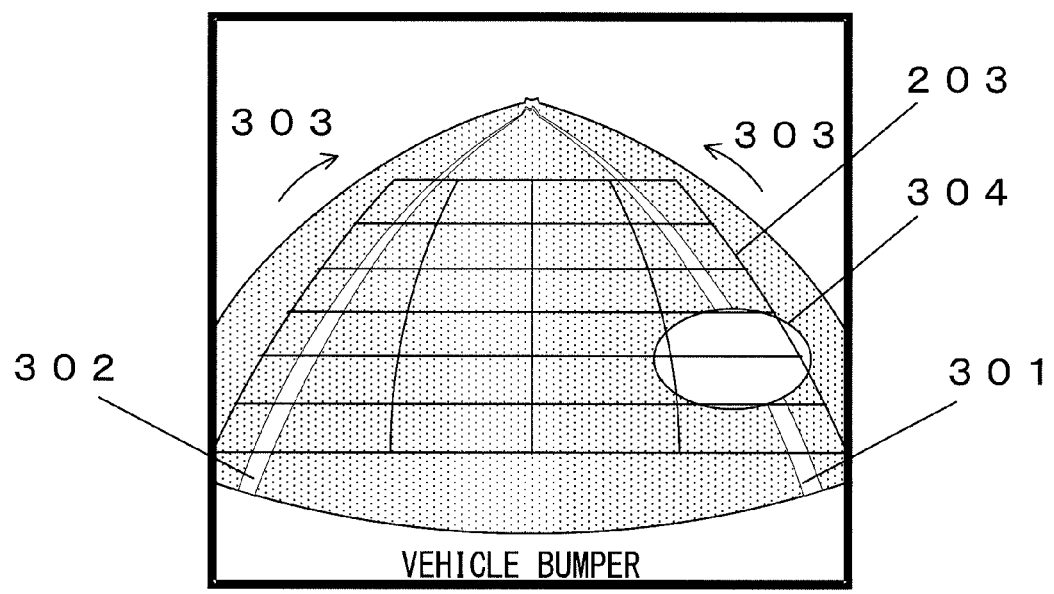

FIG. 4 illustrates an image of the range ahead of a vehicle captured by the camera 2a. It can be seen that solid traffic lane lines 301, 302 extend in the vehicle traveling direction on right and left sides of the screen. Arrows 303 indicate the vehicle traveling direction. Since a fish-eye lens is used in the camera 2a, each arrow 303 indicating the vehicle traveling direction is an oblique line having a slight curve toward the vanishing point on right or left side of the judged range. An example is shown here, in which there is dirt at a position on the lens of the camera 2a corresponding to a location 304 and the solid traffic lane line 301 captured by the camera 2a is broken at the location 304.

Figure 5:
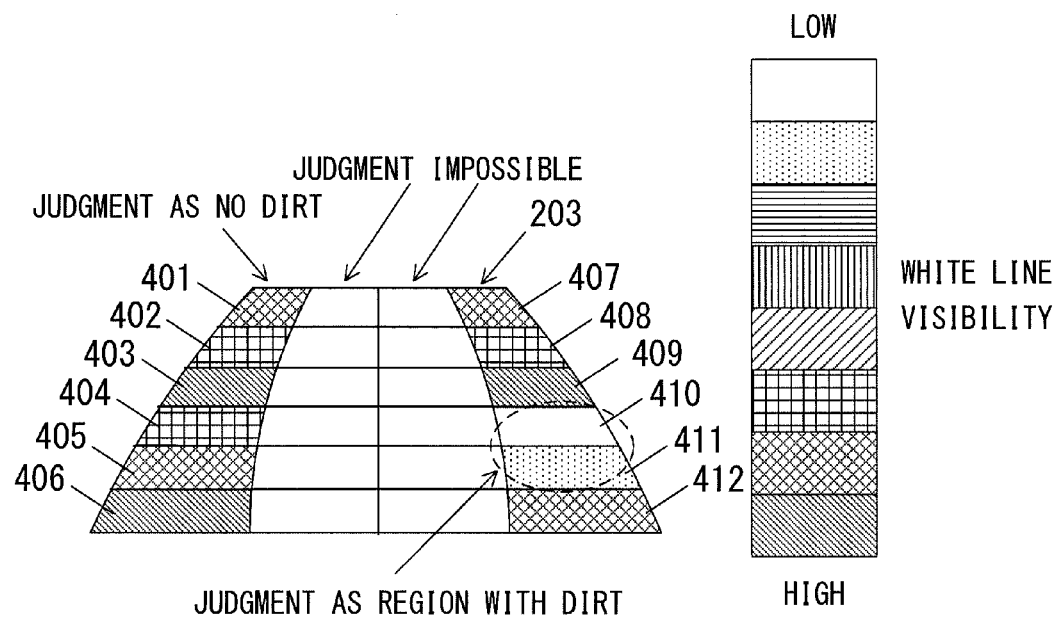
FIG. 5 A view illustrating resulting cumulative scores in the plurality of regions divided by a judged range dividing unit 101.

FIG. 5 is a view illustrating resulting cumulative scores in the plurality of regions of the judged range 203 divided by the judged range dividing unit 101 and corresponds to the situation in FIG. 4. FIG. 5 visually illustrates values of the score areas in the memory, on the judged range 203. It can be seen that points have been accumulated for left regions 401-406 of the judged range 203, consecutively. This implies that the solid traffic lane line 302 is extracted continuously or at a significant frequency and thus points are added and accumulated in the regions 401-406. Specifically, this results from the fact that, each time a captured image is acquired, the solid traffic lane line 302 in FIG. 4 moves in an opposite direction to the vehicle traveling direction on the captured image screen, so that extraction of the traffic lane line is detected and scored (points are correspondingly added) in the consecutive regions 401-406 in the vehicle traveling direction.

On the other hand, in right regions 407-412 in the judged range 203, it can be seen that points have been accumulated for the regions 407-409, consecutively, and there is no score for the region 410, the score is very small for the region 411, and points have been accumulated for the region 412. This implies that in the regions 407-409 and 412, the solid traffic lane line 301 is extracted continuously or at a significant frequency and thus points are added and accumulated. In addition, this implies that in the region 410, the solid traffic lane line 301 is not detected and no point is accumulated. The situation of the region 411 results from the fact that the solid traffic lane line 301 was detected and scored in the past, but the frequency of its detection was very small, or the traffic lane line 301 was once detected and thereafter points were subtracted by the subtraction processing described herein-below. The above-described findings suggest that in the regions 410, 411, the solid traffic lane line 301 is not or rarely detected and therefore points have not been accumulated or the scores are very small, due to presence of dirt at the position on the lens of the camera 2a corresponding to the location 304 in FIG. 4.

It will now be described how the judging unit 106 judges regions where foreign matters are adhered, based on the resulting cumulative scores as illustrated in FIG. 5. It is assumed here that there should be resulting cumulative scores in consecutive regions in the vehicle traveling direction if a traffic lane line is detected. Specifically, a plurality of regions of the judged range 203 are grouped in rows, wherein regions are consecutive in the vehicle traveling direction in each row, and the following processing is performed for each row.

In each row, a region having the maximum cumulative score is determined and the maximum value is set to 1 to normalize the scores of the regions so that the mean value of the normalized values is determined. Then, a region having its normalized value equal to or lower than 0.2 (i.e. the difference from the maximum value is 0.8 or more) and smaller than the average value of the normalized values by 0.3 or more is judged as a region where foreign matters are adhered. The condition in which the value is smaller than the average value by 0.3 or more is imposed to exclude a case where the number of regions having their cumulative scores is too small in the row. The above-described numeric values are merely exemplary and not necessarily limiting. Other approaches may also be applied to the judgment.

For example, in each row, it is determined that a traffic lane line should be detected in the row, if there are a predetermined number or more of consecutive regions having their normalized value equal to or higher than a predetermined value. Then, in the row, regions having their normalized value equal to or lower than the predetermined value can be determined as regions where foreign matters are adhered.

On the contrary, if a row includes no region having its cumulative score, it is determined that the judgment of adhesion of foreign matters are impossible.

Positions where foreign matters are adhered can be determined at a glance, by classifying the cumulative scores so as to easily visually recognize score levels and showing the scale as a white line visibility as illustrated in FIG. 5, and displaying the contents of FIG. 5 on a monitor (not shown) in the vehicle.

Figure 6:
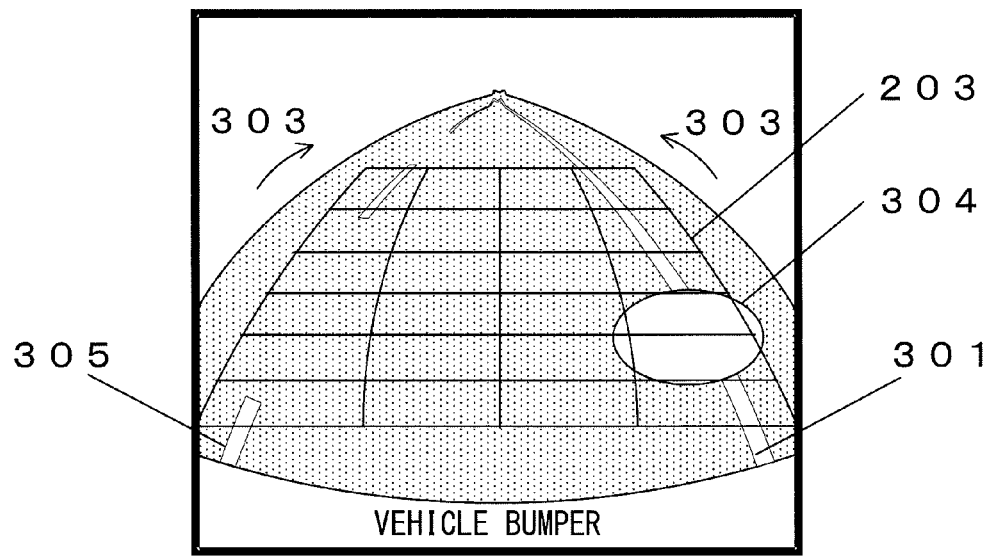
Figure 7:
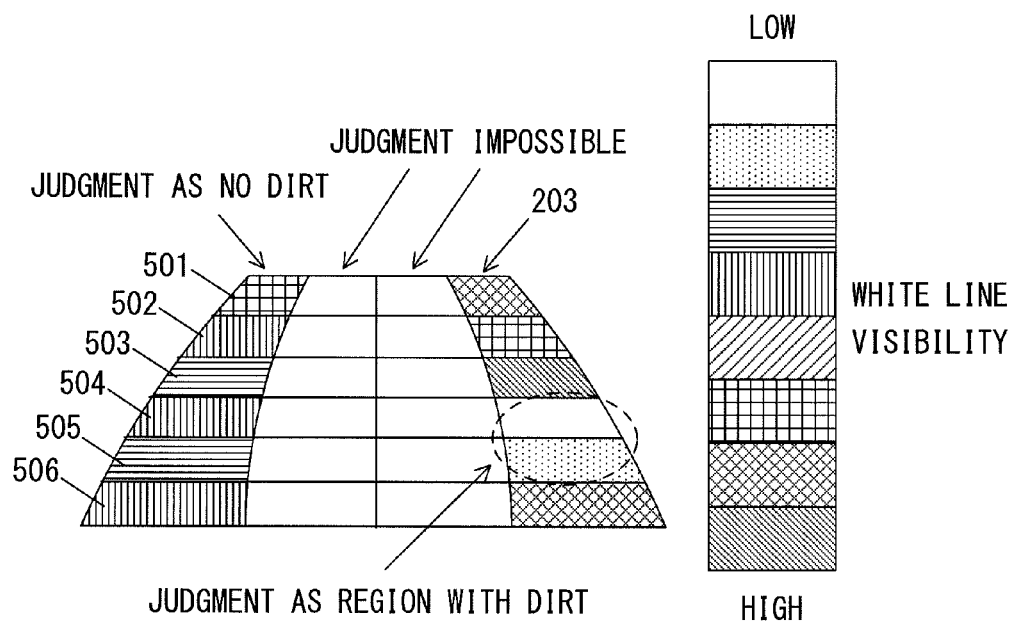
FIG. 7 A view illustrating resulting cumulative scores in the plurality of regions divided by a judged range dividing unit 101.

FIG. 6 is a view similar to FIG. 4, but showing an example in which a left traffic lane line on the screen is a dashed traffic lane line 305. FIG. 7 corresponds to the situation in FIG. 6 and illustrates resulting cumulative scores in the plurality of regions of the judged range 203 divided by the judged range dividing unit 101. Because the traffic lane line 305 in FIG. 6 is a dashed traffic lane line, the traffic lane line is not always detected in each and all region 501-506 in a vertical row in one captured image. However, when extraction of the traffic lane line is performed for a plurality of images acquired in a time series, the extraction of the traffic lane line is detected and scored in all regions 501-506 at an appropriate frequency. Therefore, although point accumulation in each region takes more time in comparison to the solid traffic lane line 302, points are accumulated in a similar way to the solid traffic lane line, after a while.

In this way, the judging unit 106 can determine whether foreign matters are adhered to the camera 2*a*, based on the resulting cumulative scores of the plurality of divided regions of the judged range of the camera 2*a*.

The outputting unit 107 outputs the judgment result of presence or absence of adhesion of foreign matters in the judging unit 106, i.e. general information about whether or not foreign matters are adhered on the whole, information about regions determined as having no adhesion of foreign matters, information about regions determined as having adhesion of foreign matters, and information about regions where the judgment of foreign matters is impossible, to an upper-level application. If the upper-level application is run by the on-vehicle control device 1, this process is regarded as data passing between programs within the on-vehicle control device 1. On the other hand, if the upper-level application is run by the upper-level vehicle control device 4, which is at an upper level than the on-vehicle control device 1, the information would be output from the on-vehicle control device 1 to the upper-level vehicle control device 4.

Figure 8:
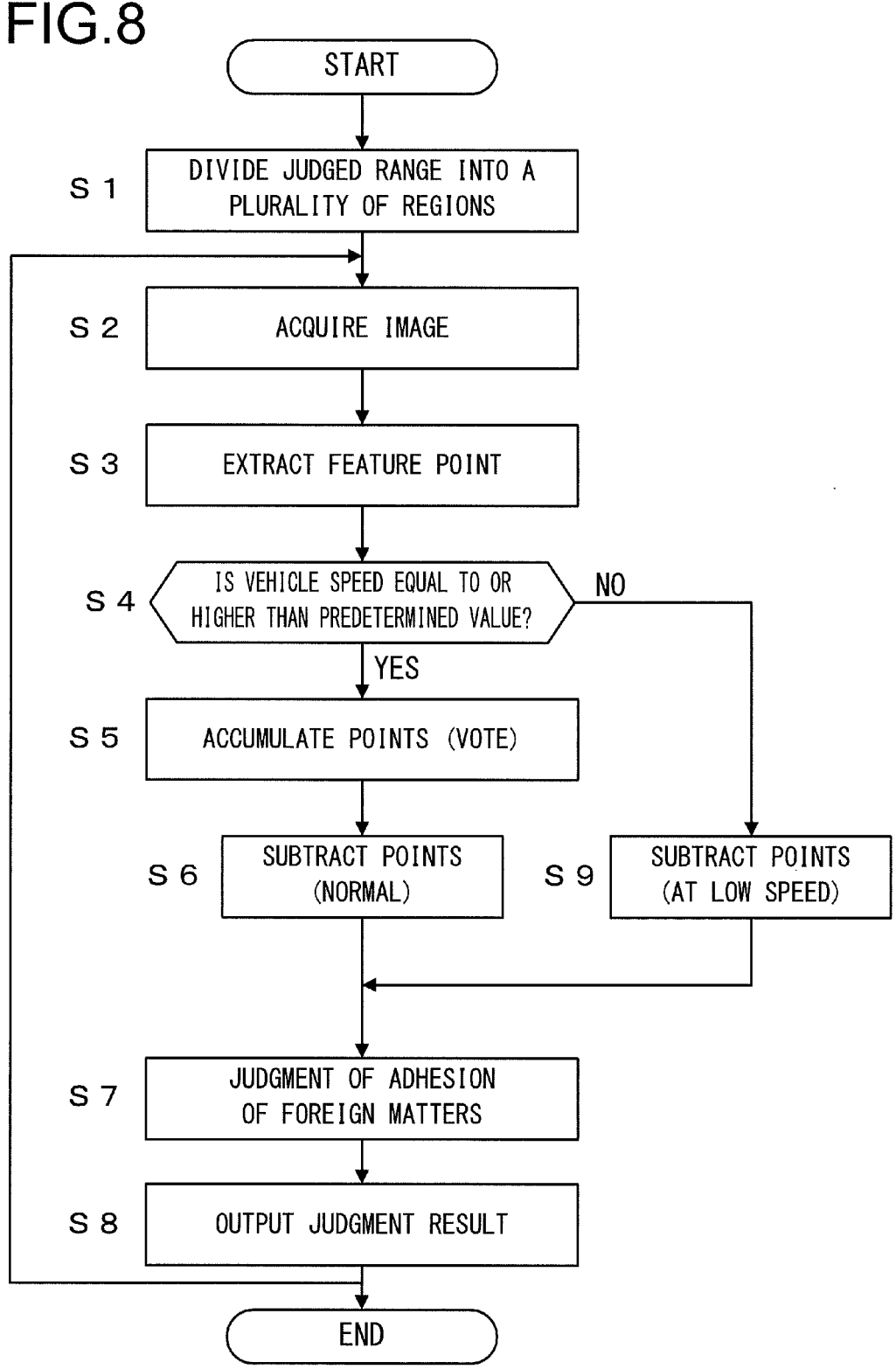
FIG. 8 A view illustrating a flowchart of processings executed by the on-vehicle control device 1.

FIG. 8 is a view illustrating a flowchart of processings executed by the on-vehicle control device 1. The on-vehicle control device 1 executes a predetermined program to perform steps of the flowchart. The processing in FIG. 8 is initiated by switching an ignition key switch of the vehicle to an ON position, for example.

In step S1, the on-vehicle control device 1 sets a judged range to be judged whether foreign matters are adhered, in an image-capturing range of the camera 2*a*, and divides the judged range into a plurality of regions, as described above. In addition, score areas for storing cumulative scores corresponding to the plurality of divided regions are provided in the memory. Step S1 corresponds to the processing of the judged range dividing unit 101 described above.

In step S2, the on-vehicle control device 1 acquires an image from the camera 2*a*. Step S2 corresponds to the processing of the image acquiring unit 102. In step S3, extraction of a feature point is performed. The processing in step S3 corresponds to the processing of the feature point extracting unit 13. In step S4, it is determined whether the vehicle speed of the vehicle is equal to or higher than a predetermined value (for example, 10 km per hour). If the vehicle speed of the vehicle is equal to or higher than the predetermined value, then the program proceeds to step S5, while if the vehicle speed of the vehicle is lower than the predetermined value, the program proceeds to step S9.

In step S5, the on-vehicle control device 1 performs a processing of adding predetermined points for a region where there is the feature point extracted in step S3. The points are added to the previous score to make a cumulative score. Such a processing may be referred to as "voting" for the region. The processing in step S5 corresponds to the processing of the point accumulating unit 104 described above. In step S6, a processing of evenly subtracting predetermined points in the plurality of divided regions is performed. The processing in step S6 corresponds to the normal subtraction processing of the point subtracting unit 105.

In step S7, based on the cumulative score of each region resulting from the point addition and accumulation processing in step S5 and the point subtraction processing in step S6, it is judged whether foreign matters such as raindrops or dirt are adhered to the camera 2*a*. The processing in step S7 corresponds to the processing of the judging unit 106 described above. In step S8, the judgment result of adhesion of foreign matters in step S7 is output to the upper-level application. The processing in step S8 corresponds to the processing of the outputting unit 107 described above. Thereafter, the program returns to step S2 and the processings are repeated.

On the other hand, in step S9, the on-vehicle control device 1 performs a point subtraction processing if the vehicle travels at a speed equal to or lower than the predetermined speed, and proceeds to step S7. The processing in step S9 corresponds to the processing of subtraction at low speed in the point subtracting unit 105.

According to the embodiment described above, the following operational advantages can be achieved.

(1) An on-vehicle control device 1 is configured to acquire a captured image from a camera 2*a* (an image-capturing device) which captures an image of the surroundings of a vehicle (an image acquiring unit 102); divide a predetermined range of an image-capturing range of the camera 2*a* into a plurality of regions (a judged range dividing unit 101); extract a feature point having predetermined characteristics in the surroundings of the vehicle, i.e. a feature point of a traffic lane line, from the acquired image (a feature point extracting unit 103); accumulate points (vote) for a region where there is the extracted feature point, among the plurality of divided regions, for a plurality of images captured in time series (a point accumulating unit 104); and judge whether foreign matters are adhered to the camera 2*a* based on the resulting cumulative scores of the plurality of regions. In this way, adhesion of foreign matters to the camera 2*a* can be quickly and reliably judged by means of a simple approach. Additionally, it can also be judged at which positions of the camera 2*a* the foreign matters are adhered. Furthermore, even if the traffic lane lines have no certain periodicity because of a dirty road or faded traffic lane lines, adhesion of foreign matters to the camera 2*a* can be reliably judged, as long as the feature points of the traffic lane lines can be extracted.

(2) The on-vehicle control device 1 is configured to judge adhesion of foreign matters, based on the resulting cumulative scores of consecutive regions in the vehicle traveling direction, among the plurality of regions in the judged range. In this way, the effect described in the above-described item (1) can be reliably achieved.

(3) The feature point having predetermined characteristics in the surroundings of the vehicle is a driving traffic lane line on the road, and the on-vehicle control device 1 is configured to perform the judgment of adhesion of foreign matters to the camera 2*a* if the vehicle travels on the road having driving traffic lane lines. This ensures that the judgment is performed during vehicle traveling on the road having traffic lane lines, and thereby the effect described in the above-described item (1) can be reliably achieved.

(4) The on-vehicle control device 1 is configured to perform a processing of accumulating points if the vehicle travels at a speed equal to or higher than a predetermined speed. For example, when the vehicle is stopped, the images acquired by the camera 2*a* are always almost same. It is inappropriate to extract traffic lane lines or the like from these images and accumulate the points. This is also the case with a low vehicle speed. The inappropriate point accumulation processing can be avoided by the on-vehicle control device 1 judging the speed of the vehicle. In other words, the image is captured and the accumulation processing is performed if the vehicle travels on the road at a speed equal to or higher than the predetermined speed, so that detection of a traffic lane line and accumulation of points are evenly performed in consecutive regions in the vehicle direction, which allows an accurate judgment of adhesion of foreign matters.

(5) The on-vehicle control device 1 is configured to reduce the cumulative scores if the vehicle travels on the road at a speed lower than the predetermined speed; and judge adhesion of foreign matters to the camera 2a based on the scores resulting from the point accumulation and subtraction in the plurality of regions. Adhesion of foreign matters varies depending on circumstances. However, it is inappropriate to keep the previously obtained cumulative scores unchanged, if the speed of the vehicle continues to be lower than the predetermined value and an inappropriate condition for the judgment of adhesion of foreign matters continues for a long time. Then, the above-described configuration allows the cumulative scores to be gradually reduced to finally be in a state equivalent to a reset state. However, if the vehicle speed becomes equal to or higher than the predetermined value at some point in time so as to bring an appropriate condition for the judgment of adhesion of foreign matters, the points accumulated until this point in time can be carried over so that a quick and accurate judgment of adhesion of foreign matters can be performed.

(6) The on-vehicle control device 1 is configured to determine the maximum value and the mean value of the cumulative scores (normalized scores) of consecutive regions in the vehicle traveling direction, among the plurality of regions in the judged range; and judge a region having its cumulative score lower than the maximum value by e.g. 0.8 and more and lower than the average value by e.g. 0.3 or more, as a region where foreign matters are adhered, among the consecutive regions in the vehicle traveling direction. In this way, the judgment of adhesion of foreign matters can be reliably and suitably performed.

(7) The on-vehicle control device 1 is configured to divide the judged range into a plurality of regions with reference to distance on a screen or distance on the road surface in a vehicle traveling direction, and with reference to distance on the road surface in a direction orthogonal to the vehicle traveling direction. Thereby, feature points including white lines, road shoulders, or guardrails located at almost equal distances along the vehicle traveling direction can be evenly scored (voted) for all regions in the vertical direction, if no adhered matter is present on the lens. The judgment of the adhered matters can thus be performed based on the cumulative scores (the cumulative votes) of the feature values.

(Variation)

(1) Although the example involving the judgment of adhesion of foreign matters to the camera 2a has been described in the above-described embodiment, the present invention is not necessarily limited to this example. Judgment of adhesion of foreign matters to the camera 2b, 2c, or 2d can be performed in a similar manner. In particular, judgment of adhesion of foreign matters to the camera 2d, which captures an image of a range behind the vehicle, can be performed by the same approach.

For the cameras 2b, 2c which capture images of ranges on respective sides of the vehicle, the vehicle traveling direction is the lateral direction in the captured images. Therefore, a plurality of regions of the judged range may be grouped in lateral rows in which regions are consecutive in the vehicle traveling direction and the processing of the judging unit 106 described above may be performed for each row.

(2) Although the above-described embodiment has been described as comprising four cameras 2a-2d, the present invention is not necessarily limited to this example. The number of cameras mounted on the vehicle and the judged range are not limited to this. For each camera, the vehicle traveling direction may be determined and the above-described processing may be performed on a group of consecutive regions in this direction.

(3) Although the example involving the judgment of adhesion of foreign matters such as waterdrops or dirt such as mud has been described in the above-described embodiment, the present invention is not necessarily limited to this example. In most cases, foreign matters such as waterdrops or dirt such as mud are usually adhered to an outwardly facing lens surface of the camera 2a. However, for some reason, foreign matters such as dirt may be adhered to surfaces of optics or image sensors within the camera 2a. With the approach in this embodiment, it can be used for judgment of adhesion of such foreign matters.

(4) Although the extraction of the feature point of the traffic lane line drawn on the road has been described as an example in the above-described embodiment, the present invention is not necessarily limited to this example. Extraction of feature points such as guardrails, road shoulders, or fences beside roads is also conceivable. Any objects may be feature points, provided that they continuously extend on the road and can be extracted as the feature points on the road.

(5) Although the judgment is performed using the normalized values of the scores in the above-described embodiment, the present invention is not necessarily limited to this example. For example, the values of the scores may be directly used to determine the maximum value and the mean value to perform the judgment.

(6) Although the judged range dividing unit 101 divides the judged range with reference to distance on a screen in a vehicle traveling direction, and with reference to distance on the road surface in a direction orthogonal to the vehicle traveling direction in the above-described embodiment, the present invention is not necessarily limited to this example. For example, the range may be divided with reference to distance on the road, also in the vehicle traveling direction. Furthermore, as long as the judgment of adhesion of foreign matters can be suitably performed based on the resulting cumulative scores of the consecutive regions in the vehicle traveling direction as described above, other ways of dividing may be used to divide the range into a plurality of regions.

The above-described embodiment and various variations are merely exemplary and the present invention is not limited to these embodiment and variations, as long as the features of the invention are not impaired.

The disclosure of the following priority application is herein incorporated by reference: Japanese Patent Application No. 2012-259044 (filed Nov. 27, 2012)

REFERENCE SIGNS LIST

1 . . . on-vehicle control device, 2a, 2b, 2c, 2d . . . camera, 3 . . . vehicle speed sensor, 4 . . . upper-level vehicle control device, 101 . . . judged range dividing unit, 102 . . . image acquiring unit, 103 . . . feature point extracting unit, 104 . . . point accumulating unit, 105 . . . point subtracting unit, 106 . . . judging unit, 107 . . . outputting unit

The invention claimed is:
1. An on-vehicle control device, comprising:
a CPU; and
a memory coupled to the CPU, the memory storing a program executed by the CPU to acquire a captured image from an image-capturing device, the image-capturing device capturing an image of surroundings of a vehicle,
divide a predetermined judged range of an image-capturing range of the image-capturing device into a plurality of regions,
extract a feature having predetermined characteristics in the surroundings of the vehicle by analyzing the acquired image,
add points for a region that is determined to have the extracted feature therein, among the plurality of regions, for each of a plurality of images acquired in time series, and accumulate the points to produce scores representing accumulations of points for regions that have the extracted feature, wherein the extracted feature is a driving traffic lane line on a road;
judge whether a foreign matter is adhered to the image-capturing device based on the scores resulting from accumulating points of the plurality of regions, by determining the scores in the plurality of regions consecutively in order of a vehicle traveling direction; and
output a graphical display of the scores of the plurality of regions in the judged range to a display device in the vehicle to indicate a location of the foreign matter adhered to the image-capturing device.

2. The on-vehicle control device according to claim 1, wherein:
the CPU performs processing of accumulating points if the vehicle travels on a road at a speed equal to or higher than a predetermined speed.

3. The on-vehicle control device according to claim 2, wherein:
the CPU subtracts points from the accumulated scores if the vehicle travels on the road at a speed lower than the predetermined speed; and
the CPU judges whether a foreign matter is adhered to the image-capturing device, based on scores resulting from accumulating and subtracting points for the plurality of regions.

4. The on-vehicle control device according to claim 3, wherein:
if the vehicle travels on the road at a speed lower than the predetermined speed, the CPU gradually subtracts points, a number of which is smaller than a number of points to be accumulated if the vehicle travels on the road at a speed equal to or higher than the predetermined speed, from the accumulated scores, so that the accumulated scores are reset if the vehicle continues to travel at the speed lower than the predetermined speed.

5. The on-vehicle control device according to claim 1, wherein:
the CPU determines a maximum value and a mean value of the accumulated scores of consecutive regions in a vehicle traveling direction, among the plurality of regions in the judged range, and judges a region having an accumulated score lower than the maximum value by a first predetermined value or more and lower than the average value by a second predetermined value or more, as a region where a foreign matter is adhered, among the consecutive regions in the vehicle traveling direction.

6. The on-vehicle control device according to claim 1, wherein:
the CPU divides the judged range into a plurality of regions with reference to distance on a screen or distance on a road surface in a vehicle traveling direction, and with reference to distance on the road surface in a direction orthogonal to the vehicle traveling direction.

* * * * *